United States Patent [19]

Van Pachtenbeke

[11] 4,258,878
[45] Mar. 31, 1981

[54] FLUE GAS HEAT RECOVERY SYSTEM

[76] Inventor: Ides A. Van Pachtenbeke, 11301 Hensell Rd., Holly, Mich. 48442

[21] Appl. No.: 44,469

[22] Filed: Jun. 1, 1979

[51] Int. Cl.³ .............................................. F24D 3/00
[52] U.S. Cl. ............................. 237/8 R; 165/DIG. 2; 122/20 B; 236/91 A
[58] Field of Search .................... 237/8 R, 55, 59, 19, 237/46; 165/DIG. 2, DIG. 12, 156; 122/20 B; 236/91 A

[56] References Cited

U.S. PATENT DOCUMENTS

| | | | |
|---|---|---|---|
| 576,718 | 2/1897 | Bolton | 237/46 |
| 1,028,030 | 5/1912 | Kitchen | 237/12.1 |
| 1,214,255 | 1/1912 | Altenkirch | 237/8 R |
| 2,026,399 | 2/1931 | Pierce | 122/20 B X |
| 2,072,427 | 3/1937 | O'Brien | 62/129 |
| 2,143,287 | 2/1939 | Smith | 122/20 B |
| 2,166,355 | 7/1939 | Higgins et al. | 237/59 X |
| 3,473,603 | 10/1969 | Fujie | 165/122 |
| 3,858,646 | 1/1975 | Naylor | 165/156 X |
| 3,896,992 | 7/1975 | Borovina et al. | 237/8 R X |
| 4,037,786 | 7/1977 | Munroe | 165/DIG. 2 |
| 4,109,858 | 8/1978 | Moses | 237/8 R |

FOREIGN PATENT DOCUMENTS

| | | | |
|---|---|---|---|
| 2402991 | 7/1975 | Fed. Rep. of Germany | 122/20 B |
| 2435563 | 5/1976 | Fed. Rep. of Germany | 122/20 B |
| 2721301 | 11/1978 | Fed. Rep. of Germany | 122/20 B |
| 2377586 | 11/1978 | France | 122/20 B |
| 562430 | 5/1975 | Switzerland | 122/20 B |

OTHER PUBLICATIONS

Caso, L. *Flue–Pipe Water Heater,* Popular Science, p. 70, Mar., 1979.

Primary Examiner—Albert J. Makay
Assistant Examiner—Henry Bennett
Attorney, Agent, or Firm—Basile, Weintraub & Hanlon

[57] ABSTRACT

A flue gas heat recovery system for dwelling hot water heating system boilers is disclosed. The system comprises a heat exchanger disposed in a flue for exhausting combustion products from the boiler and a circulating pump for circulating cooled water from the heating system through the exchanger to be warmed by the combustion products. The system includes a by-pass line for by-passing the heat exchanger, and control valves for varying the amount of cooled water diverted around the heat exchanger.

2 Claims, 3 Drawing Figures

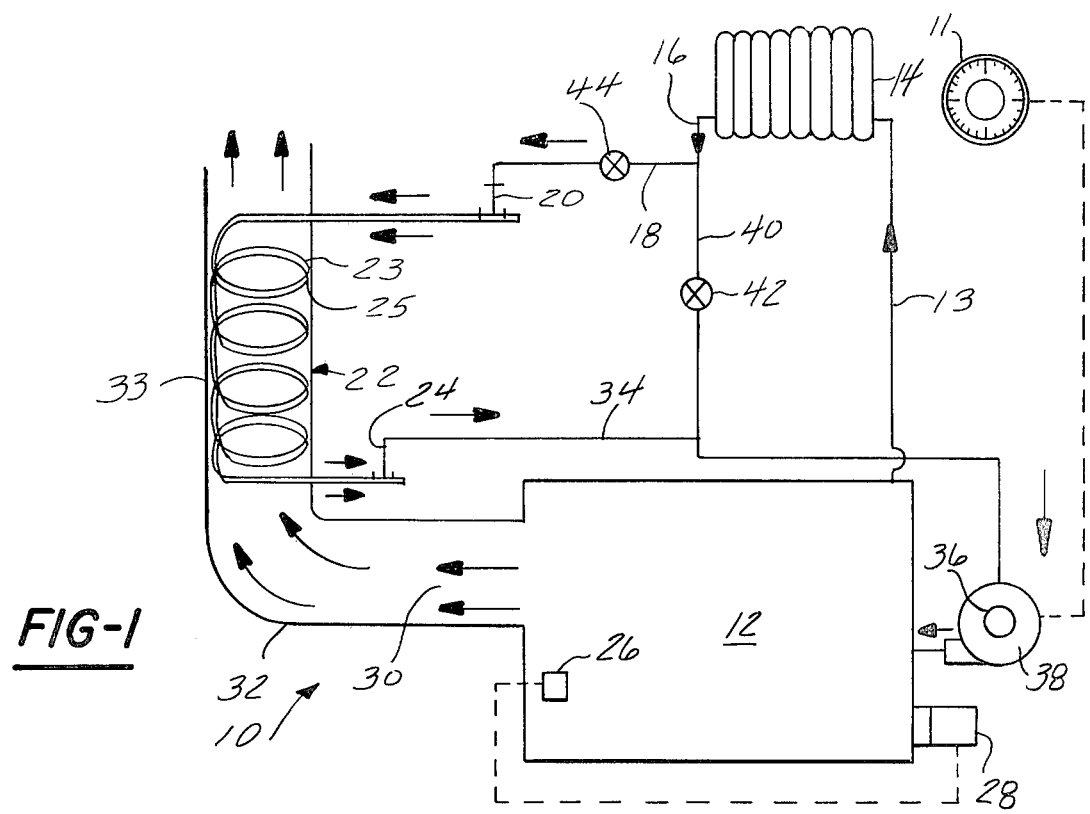
*FIG-1*
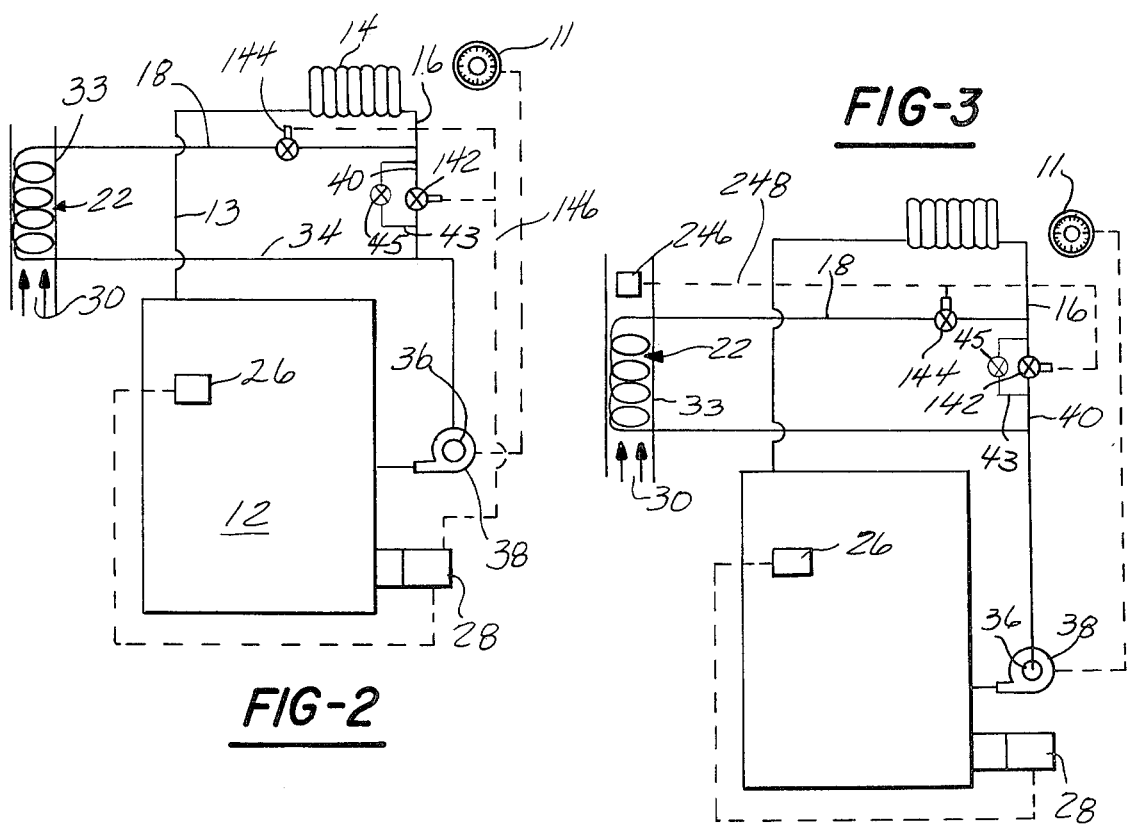
*FIG-2*
*FIG-3*

FLUE GAS HEAT RECOVERY SYSTEM

BACKGROUND OF THE INVENTION

I. Field of the Invention

The present invention relates to the field of boilers for hot water heating systems, and more particularly the present invention relates to the field of waste heat recovery from boiler flue gases. Even more particularly the present invention relates to the field of waste heat extraction from boiler flue gases to warm the incoming flow of water into the boiler.

II. Prior Art Statement

A search of the issued United States patents reveals the following United States patents which have been issued in the field relating to the present invention. U.S. Pat. No. 576,718 discloses a system for circulating room air across the condensing coil of a steam engine to condense the steam and warm the room air. U.S. Pat. No. 1,028,030 discloses a coke making plant wherein waste gas from the coke production is utilized to produce steam for operating a steam engine. U.S. Pat. No. 2,026,399 discloses a system for utilizing flue gas heat to heat hot water for household use. U.S. Pat. No. 2,072,427 discloses an air conditioning system wherein room air is blown past cold liquid conduits to cool the room air and prevent condensation on the conduits. U.S. Pat. No. 1,214,255 discloses a system which utilizes the waste heat of a refrigeration system to augment a dwelling heating system. U.S. Pat. No. 2,166,355 discloses a system for utilizing flue gas waste heat to heat water in a hot water tank for household use. U.S. Pat. No. 3,473,603 discloses an air to liquid heat exchanger which employs a coil and fins to improve heat transfer from the air to the liquid. U.S. Pat. No. 3,896,922 discloses a plurality of pipes including heat recovery pipes in heat exchange relationships with the hot flue gases in the flue of a furnace to heat water for space heaters and to pre-heat water for household use. U.S. Pat. No. 4,109,858 discloses a system which utilizes heat exchangers in a room having excess heat to warm water for household purposes.

In the March 1979 issue of "Popular Science" on Page 70 an article by Louis Caso discloses a system for extracting waste heat from a boiler flue gas to heat water in a storage tank. The storage tank is employed to provide warm water to a circulating pump inlet. A heat exchanger is placed in the boiler flue and a thermo syphon method is employed to circulate cold water from the storage tank bottom through the heat exchanger where the water is heated and returned to the top of the storage tank. The flow of water through the heat exchanger is soley induced by the thermo syphon method and no provision is made for selective circulation of water through the heat exchanger.

None of the above listed United States patents, nor the magazine article, disclose a flue gas heat recovery system for dwelling hot water heating system boilers which utilizes a heat exchanger in the flue for extracting heat from the combustion products of the boiler to warm water from room radiators before the water is returned to the boiler. None of the above listed United States patents disclose a system for controlling the amount of water circulating through the heat exchanger by means of a by-pass conduit and control valves.

SUMMARY OF THE INVENTION

The present invention comprises a flue gas heat recovery system for dwelling hot water heating system boilers which include a flue for exhausting combustion products; a circulating pump for transmitting hot water from the boiler through conduits to a room radiator where the hot water cools giving up heat to warm the room; the cool water returning from the radiator to the heat exchanger where flue gases give up their heat to warm the cooled water; the warmed water passes from the heat exchanger to a circulating pump inlet; the water is then pumped from the circulating pump to the boiler. A conduit interconnected between an inlet and an outlet of the heat exchanger is employed to selectively by-pass cooled water around the heat exchanger. Valves interposed in the by-pass line and a heat exchanger circulating line selectively by-pass all or a portion of the cooled water around the heat exchanger to optimize the extraction of waste heat from the flue gases.

For a more complete understanding of the present invention reference is made to the following detailed description and accompanying drawing.

Other objects, advantages, and applications of the present invention will become apparent to those skilled in the field to which this invention pertains, when the accompanying description of the best modes contemplated for practicing the invention are read in conjunction with the accompanying drawing.

BRIEF DESCRIPTION OF THE DRAWING

In the drawing, like reference numbers refer to like parts throughout the several views, and wherein:

FIG. 1 illustrates a preferred embodiment of the present invention;

FIG. 2 illustrates an embodiment of the invention employing solenoid valves to by-pass the heat exchanger when the burner of the boiler is not operating; and FIG. 3 illustrates an embodiment of the present invention wherein the heat exchanger is by-passed in response to a pre-set temperature for the products of combustion.

DESCRIPTION OF THE PREFERRED EMBODIMENT

In a conventional hot water heating system for dwellings, combustibles such as fuel oil or gas are burned in a boiler to heat water contained within the boiler. The hot water is conducted from the boiler to room radiators by conduits where the hot water gives up its heat to the surrounding room and the cool water is recirculated by conduit to the inlet of a recirculating pump where the water is returned to the boiler. The products of combustion are passed from the furnace through an exhaust pipe to a flue where they are exhausted to the atmosphere. The temperature of the products of combustion in the flue normally run between 600 and 800 degrees F. The temperature of the cooled water returning from the radiators to the boiler is between 120 and 130 degrees F., and the temperature of the water in the boiler is maintained from 140 to 160 degrees F. The present invention, as will be described subsequently, endeavors to use the waste heat contained in the 600 to 800 degrees F. products of combustion to warm the temperature of the cooled water before the water is returned to the boiler. The temperature of the boiler is maintained between 140 and 160 degrees F. by a temperature sensing aquastat 26 FIG. 1 which monitors the boiler temperature and turns on a burner 28 to heat the boiler water when the boiler water temperature drops below 140 degrees F. When the burner has raised the temperature of the boiler water to 160 degrees F. the aquastat turns off the burner. By utilizing flue gas waste heat to increase the temperature of the cooled water before it is returned to the boilers, as in the present invention, the boiler more quickly is returned to the temperature at which the burner is turned off, and less burner time is required to provide the necessary heat to the dwelling.

Referring now to the drawing and in particular to FIG. 1 wherein there is illustrated at 10 a preferred embodiment of the present invention comprising a boiler 12 for supplying hot water to radiator 14 which provides heat to a dwelling. Hot water is passed from the boiler 12 to the radiator 14 via a conduit 13 where the hot water is cooled as it passes through the radiator 14 giving up heat to warm the dwelling. The cooled water from the radiator 14 passes through conduits 16,18 to a heat exchanger inlet 20. From the heat exchanger inlet 20 the cooled water passes through a heat exchanger 22 to a heat exchanger outlet 24. When the aquastat 26 detects a boiler temperature below a predetermined level, the burner 28 is turned on and a mixture of combustibles and air are mixed and burned within the boiler. The hot products of combustion 30 are exhausted from the boiler through an exhaust pipe 32. The hot products of combustion 30 are directed past the heat exchanger 22 contained in a flue 33, where a portion of their waste heat is given up to the cooled water passing therethrough. The warmed water from the heat exchanger passes to the heat exchanger outlet 24, then to a conduit 34 where the warmed water is passed to a circulating pump inlet 36.

In an optimum system, sufficient cooled water is circulated through the heat exchanger 22 to reduce the temperature of the products of combustion leaving the heat exchanger to a temperature of 300 to 400 degrees F. To optimize the system, a by-pass conduit 40 and a by-pass valve 42 are connected to the conduit 16 and the conduit 34 to by-pass a portion of the cooled water around the heat exchanger 22. An inlet valve 44 is interposed within the conduit 18 to restrict the flow of cooled water in the heat exchanger 22. By controlling the opening of the valves 42,44 an optimum temperature for the products of combustion can be obtained.

Referring again to the drawing, and in particular to FIG. 2 wherein there is illustrated at 100 a second embodiment of the present invention. In the second embodiment of the present invention a thermostat 11 detects when the room temperature has dropped below a pre-set level and turns on a circulating pump 38 which induces flow from the boiler 12 to the conduit 13 which directs hot water from the boiler 12 to the radiator 14. As the hot water passes through the radiator 14 it gives up heat to the surrounding room as it cools. The boiler cools as it passes hot water to the radiator, and when the boiler water reaches a minimum temperature the aquastat 26 turns on the burner 28. The cooled water passes from the radiator to a conduit 18 to the heat exchanger 22. As the cooled water passes through the heat exchanger 22 hot combustion products 30 passing through the flue 33 warm the water passing through the heat exchanger 22. The warmed water passes from the heat exchanger 22 through a conduit 34 to the inlet 36 of the circulating pump 38. A by-pass line 40 selectively by-passes the heat exchanger 22 in a manner which will be described more fully hereinbelow. A solenoid valve 142 in the by-pass line 40 and a solenoid valve 144 in the conduit 18 are activated by a sensing line 146 which detects when the burner 28 has been turned on. When the burner 28 has been turned on the solenoid valve 142 is closed and the solenoid valve 144 is opened forcing the cooled water from the radiator 14 to pass through the heat exchanger 22 to be warmed by the products of combustion 30 passing through the flue 33. When the burner 28 is off and there are no products of combustion 30 passing through the flue 33 the sensing line 146 opens the solenoid valve 142 and closes the solenoid valve 144 by-passing the cooled water from the radiator 14 around the heat exchanger 22 sending the cooled water directly to the circulating pump inlet 36.

Referring now to the drawing and in particular to FIG. 3 wherein there is illustrated at 300 a third embodiment of the present invention. In the third embodiment of the present invention a room thermostat 11 detects a room temperature below a pre-set level and activates the circulating pump 38 in the manner described above. The circulating pump forces the flow of hot water to the radiator 14 by conduit 13. The hot water passing through the radiator gives up it's heat to warm the room with the hot water cooling in the process. The cooled water passes from the radiator through conduits 16 and 18 to heat exchanger 22. Hot products of combustion 30 passing through the flue 33 warm the water passing through the heat exchanger 22, the warmed water passes through conduit 34 to the circulating pump inlet 36. The aquastat within the boiler 12 turns on the burner 28 when the temperature of water within the boiler reaches a predetermined lower level, and turns off the burner 28 when the water in the boiler has reached a predetermined upper level. The by-pass line 40 with the solenoid by-pass valve 142 and the solenoid valve 142 interposed in the conduit 18 cooperate to control the flow of cooled water through the heat exchanger in a manner which will be described more fully hereinbelow. A thermostat 246 disposed in the flue 33 measures the temperature of the combustion products 30, and when the temperature of the combustion products 30 is below a predetermined level a sensing line 248 closes solenoid valve 144 and opens solenoid valve 142 by-passing the cooled water flow around the heat exchanger 22 sending the cooled water directly to the circulating pump inlet 36. When the thermostat 246 detects a temperature for the products of combustion 30 above a predetermined level a signal is sent via sensing line 248 to open the solenoid valve 144 and close the solenoid valve 142 which forces the cooled water from radiator 14 to circulate through the heat exchanger 22 to be warmed before passing to the inlet 36 of the circulating pump 38.

There has been described hereinabove a heat recovery system for dwelling hot water heating system boilers which have been improved by the employment of a heat exchanger in the flue of the boiler in a path of the combustion products. By employing the teachings of the present invention a substantial improvement in the efficiency of a boiler is obtainable and attractive reduction in fuel costs and fuel consumption can be realized.

The heat exchanger 22 of the present invention comprises a pair of parallel coiled conduits 23,25 having an inlet and outlet. The cooled water divides at the inlet end of the conduit and flows through each of the coiled conduits 23,25. After passing through the parallel cold conduits 23,25 the water is warmed and the flow from the conduits outlet end is combined to a single conduit to flow to the circulating pump inlet 36. By employing a pair of parallel coiled conduits as the heat exchanger, an increase in the ratio of surface area of the coils to the volume of water contained within the coils is achieved which improves the efficiency of the heat exchanger 22.

If the flow capacity of the heat exchanger 22 is less than the capacity of the circulating pump 38, it becomes necessary to provide an open by-pass line 43 around the solenoid valve 142 of FIGS. 2 and 3. A manually adjustable valve 45 in the line 43 is adjusted to provide adequate flow to the circulating pump inlet 36 when the solenoid valve 142 is closed. Proper adjustment of the valve 45 allows a maximum flow of water through the heat exchanger with the balance by-passed to the circulating pump inlet.

I claim:

1. A flue gas heat recovery system of the type for dwelling hot water heating system boilers which include a flue for exhausting combustion products and a circulating pump for transmitting hot water through conduits from the boiler to a room radiator where the hot water cools giving up heat to warm the room, the cooled water returning to a circulating pump inlet where the water is pumped to the boiler, the improvement comprising:

a heat exchanger in the flue in a path of the combustion products including a pair of parallel coiled conduits to receive the cooled water, the cooled water dividing at an inlet end to pass through the conduits and be warmed, the warmed water combining at an outlet end;

the combustion products warming the water, the warmed water being conducted to the circulating pump inlet;

means for by-passing the heat exchanger when there is insufficient extractable heat in the combustion products; said means for by-passing the heat exchanger comprising:

a burner for burning air and combustibles;

an aquastat for running and stopping the burner in response to a boiler temperature;

an inlet conduit interconnecting the cooled water line to a heat exchanger inlet;

an outlet conduit interconnecting a heat exchanger outlet to the pump inlet;

a by-pass line interconnecting the inlet and outlet conduits;

a first solenoid valve in the by-pass line;

a second solenoid valve in the inlet conduit;

an electrical sensing line interconnecting the burner and the first and second solenoid valves; and wherein when the burner is running the first solenoid valve is closed and the second solenoid valve is opened allowing the cooled water to flow through the heat exchanger, and when the burner is stopped the first solenoid valve is open and the second solenoid valve is closed by-passing the heat exchanger.

2. A flue gas heat recovery system of the type for dwelling hot water heating system boilers which include a flue for exhausting combustion products and a circulating pump for transmitting hot water through conduits from the boiler to a room radiator where the hot water cools giving up heat to warm the room, the cooled water returning to a circulating pump inlet where the water is pumped to the boiler, the improvement comprising:

a heat exchanger in the flue in a path of the combustion products including a pair of parallel coiled conduits to receive the cooled water, the cooled water dividing at an inlet end to pass through the conduits and be warmed, the warmed water combining at an outlet end;

the combustion products warming the water, and the warmed water conducted to the circulating pump inlet;

means for by-passing the heat exchanger when there is insufficient extractable heat in the combustion products; said means for by-passing the heat exchanger comprising:

an inlet conduit interconnecting the cooled water conduit to a heat exchanger inlet;

an outlet conduit interconnecting the heat exchanger outlet to the pump inlet;

a by-pass line interconnecting the inlet and outlet conduits;

a first solenoid valve in the by-pass line;

a second solenoid valve in the first conduit;

a thermostat in the flue proximate the heat exchanger;

an electrical sensing line extending from the thermostat to the first and second solenoid valves; and wherein when the temperature in the flue is below a selected level the thermostat opens the first solenoid valve and closes the second solenoid valve by-passing the heat exchanger, and when the temperature in the flue exceeds a selected level the thermostat closes the first solenoid valve and opens the second solenoid valve directing the cooled water through the heat exchanger.

* * * * *